June 19, 1951          G. N. SMITH          2,557,478
EXPOSURE INDICATOR
Filed Feb. 2, 1949          3 Sheets-Sheet 1
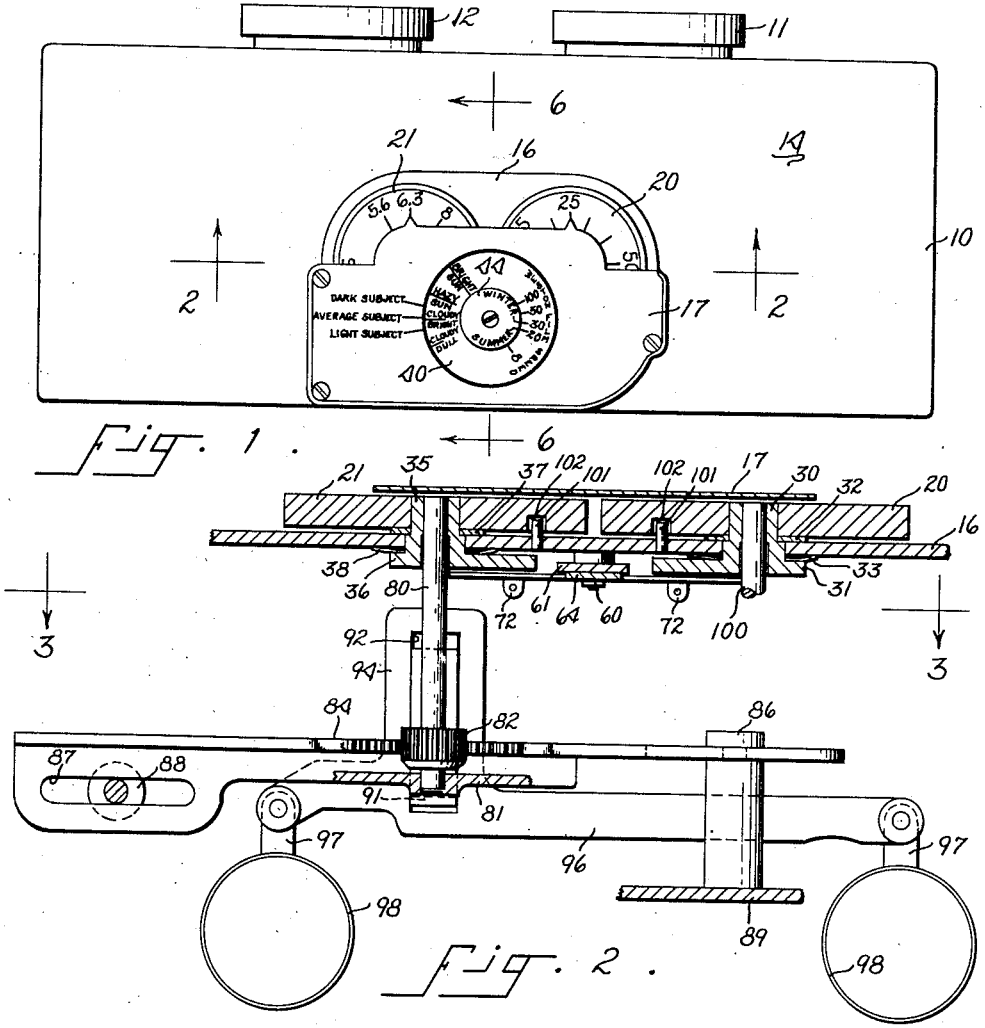
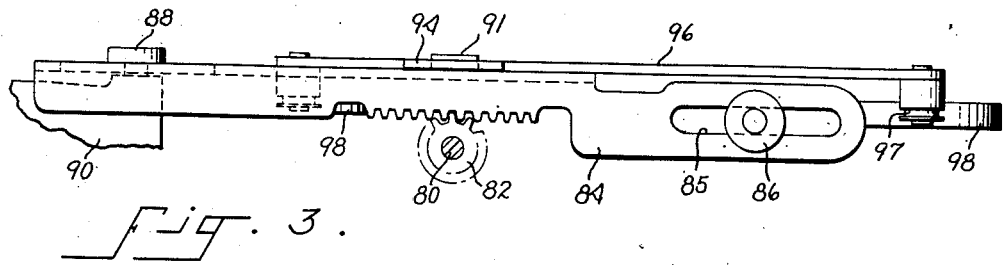
INVENTOR.
Gordon N. Smith
BY Buckhorn and Cheatham
Attorneys June 19, 1951 G. N. SMITH 2,557,478
EXPOSURE INDICATOR
Filed Feb. 2, 1949 3 Sheets-Sheet 2

INVENTOR.
Gordon N. Smith
BY Buckhorn and Cheatham
Attorneys

June 19, 1951  G. N. SMITH  2,557,478

EXPOSURE INDICATOR

Filed Feb. 2, 1949  3 Sheets-Sheet 3

INVENTOR.
Gordon N. Smith
BY Buckhorn and Cheatham
Attorneys

Patented June 19, 1951

2,557,478

UNITED STATES PATENT OFFICE 2,557,478

EXPOSURE INDICATOR

Gordon N. Smith, Portland, Oreg., assignor to Stereocraft Engineering Co., Portland, Oreg., a partnership Application February 2, 1949, Serial No. 74,156

14 Claims. (Cl. 235—64.7)

1

The present invention comprises an improvement in exposure meters and an improvement in cameras comprising an exposure meter built into the camera in such manner as to set the camera for taking proper exposures when the exposure meter is properly adjusted. Stated in another manner, the present invention comprises an improved exposure meter of such characteristics that it may be combined with a camera to operate and set the diaphragm opening and shutter speed of a camera having a diaphragm and an adjustable speed shutter.

An object of the present invention is to provide an improved exposure meter which is within the comprehension of the average camera user. All that the operator needs to do is to judge the type of subject being photographed and observe the character of the day when the photograph is being taken. The exposure meter is so characterized that it may be used as a separate exposure meter to be carried upon the person or may be built into a camera whereby operation of the exposure meter sets the camera for taking proper exposures.

Another object of the invention, therefore, is to provide an improved camera having exposure meter mechanism incorporated therein, which mechanism replaces the diaphragm and shutter speed adjusting indicator levers or dials ordinarily encountered in the better types of cameras.

A further object of the present invention is to provide a device of the foregoing type which is formed of relatively few, sturdy, inexpensive and easily assembled parts.

Reference is made to the divisional application Serial No. 190,150, filed October 14, 1950, as to matter herein disclosed but not claimed.

The objects and advantages of the present invention will be more thoroughly understood by reference to the following specification, taken in connection with the accompanying drawings, wherein like numerals refer to like parts throughout.

In the drawings—

Fig. 1 is a plan view of a camera having the present invention incorporated therein, all nonessential portions of the camera being omitted;

Fig. 2 is an enlarged vertical section taken substantially along line 2—2 of Fig. 1 and illustrating the means whereby selection of the proper shutter speed and diaphragm opening by means of the exposure meter simultaneously accomplishes the setting of the camera;

Fig. 3 is a horizontal section taken substantially along line 3—3 of Fig. 2;

2

Figure 4:
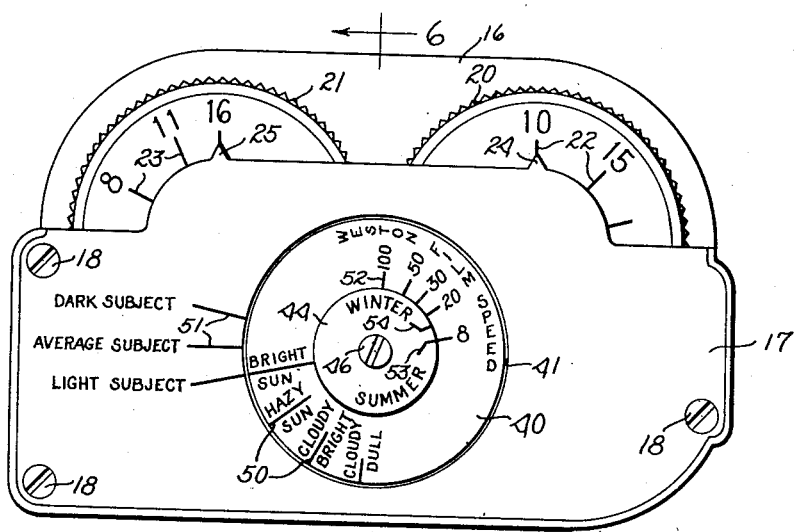
Fig. 4 is a plan view of the exposure meter alone, the meter being shown about twice its natural size.
Figure 6:
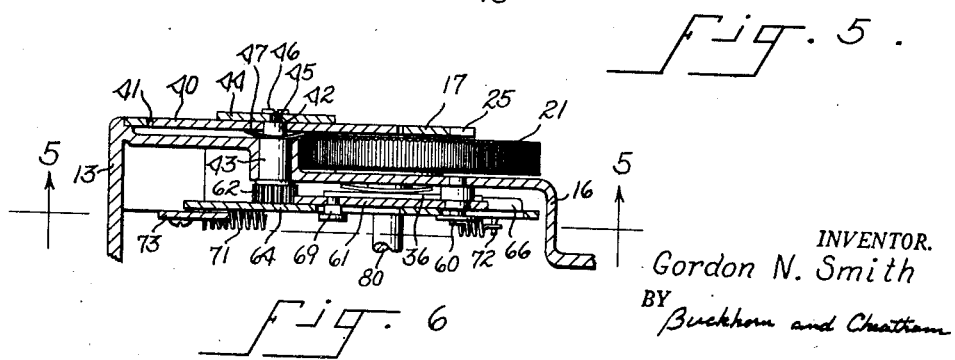
Figure 7:
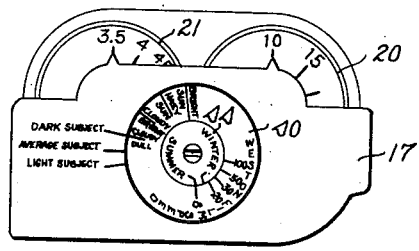
Figure 13:
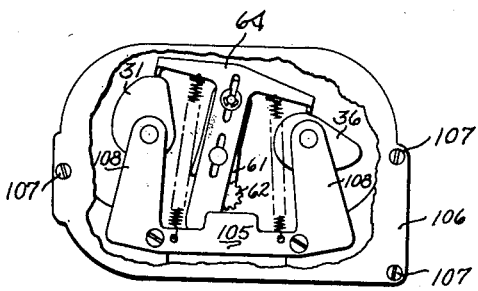
Figure 14:
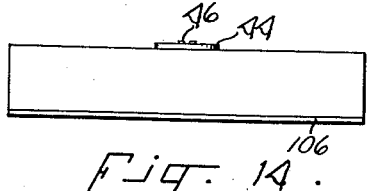

Fig. 6 is a vertical section through the exposure meter taken substantially along line 6—6 of Fig. 4;

Fig. 7 is a plan view of the exposure meter illustrating one position which the parts may assume;

Figs. 8 to 12 inclusive are views similar to Fig. 7 illustrating other positions of the parts;

Fig. 13 is a bottom view, with parts broken away, of the exposure meter when formed as a separate device which may be carried upon the person; and Fig. 14 is a side view of the modification shown in Fig. 13.

The invention is illustrated in Figs. 1 to 6 inclusive as it would be embodied in a stereoscopic camera 10 having a pair of lens assemblies 11 and 12 whereby stereoscopic pairs of exposures may be taken in the usual manner. A portion of the rear wall 13 of the camera is extended above the plane of the top wall 14, and an irregularly shaped, raised portion 16 of the top wall provides, together with the portion 13, an elevated frame for the exposure meter mechanism. Portions of the end walls of the frame are extended upward to the level of the upper edge of the portion 13 to provide a base on which a frame plate 17 is seated and retained by means of screws 18. A pair of indicator dials are horizontally mounted in the space between the portion 16 and the frame plate 17, the right dial constituting a shutter speed indicator 20 and the left dial constituting a stop indicator 21. It is to be appreciated that the indicators are herein illustrated in the form of manually engageable, rotatable indicator dials, but that other forms of movable indicators may be substituted without the exercise of invention. The shutter speed dial 20 is provided with a plurality of indicia 22 adjacent which are positioned numerals indicating the speed of the shutter in fractions of a second, and the diaphragm indicator dial 21 is provided with a plurality of indicia 23 adjacent which are provided the usual stop numerals. The frame plate 17 is provided with fixed pointers 24 and 25 opposite which may be positioned the selected speed or stop index, respectively. The outer edges of the dials are preferably knurled whereby a person holding the camera may rotate the dials by digital engagement.

Figure 5:
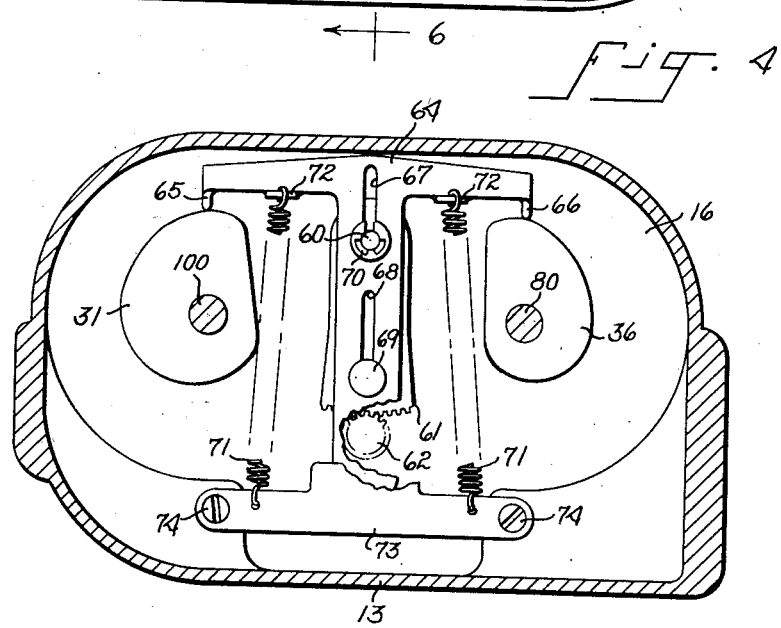
Fig. 5 is a bottom view of the exposure meter mechanism taken substantially along line 5—5 of Fig. 6.

The shutter speed indicator 20 is fixed to the hub 30 of a shutter speed cam 31 which is journaled in the frame portion 16. The central portion of indicator 20 rests upon a washer 32, and the indicator is held against the surface of the washer by a spring washer 33 interposed between the cam 31 and the lower surface of the supporting frame portion 16. Similarly, the stop indicator 21 is fixed to the hub 35 of a stop cam 36 which is journaled in the frame portion 16. The indicator 21 is separated from the upper surface of the frame portion by a washer 37, and a spring washer 38 is inserted between the cam 36 and the lower surface of the frame portion 16. The cams lie horizontally beneath the frame portion 16 in the same plane, and each cam is rotated upon movement of its associated indicator. As seen in Fig. 5, the outlines of the cams differ, the outlines of the cams being fixed by mathematically selecting variable radii which will produce desired results upon a light intensity indicator 40, as will presently appear.

The light intensity indicator dial 40 is set into an opening 41 in the frame plate 17. The dial 40 is rotatably mounted upon a reduced portion 42 of a pinion gear hub 43 journaled in the raised portion 16 of the frame. The light intensity dial is retained on the reduced portion 42 by a reference dial 44 which is keyed to a further reduced portion 45 of the pinion hub so that the reference dial rests upon the shoulder formed between the portions 42 and 45. A screw 46 is screwed into the end of the reduced portion 45 to retain the reference dial 44 in position. A spring washer 47 is positioned between the lower surface of the light intensity dial 40 and a shoulder on the hub 43 frictionally to retain the light intensity dial against the reference dial whereby the light intensity dial and the reference dial ordinarily move together as a unit. However, the reference dial is much smaller than the light intensity dial, and the exposed portion of the latter may be manually engaged to slip the friction connection and move the light intensity dial with respect to the reference dial. The light intensity dial is provided with a plurality of indicia 50 adjacent which are positioned words or other printed matter designating certain types of light conditions which are easily recognizable, for example, "bright sun," "hazy sun," "cloudy bright" and "cloudy dull." The indicia 50 extend to the outer edge of the light intensity dial for cooperation with subject indicia 51 on the fixed frame plate 17. The subject indicia are marked according to the character of the subject being photographed, in easily recognizable fashion, for example, "dark subject," "average subject" and "light subject." Any operator should be able to recognize the four degrees of sunlight and the three types of subject and, by manipulation of the dials 20 and 21 as will appear, place the proper index 50 in line with the proper index 51.

On an opposed portion of the light intensity dial 40 there are positioned a plurality of indicia 52, adjacent which are placed numerals indicating emulsion speeds in accordance with the Weston film speed system. It is obvious that other types of film classification may be utilized, provided the indicia are properly marked and spaced. The reference dial 44 is provided with a pair of reference marks 53 and 54, for example, the mark 53 being indicated as a "summer" reference mark and the mark 54 as a "winter" reference mark. The positioning of the reference marks is such that the placing of an index 52 corresponding to the emulsion speed of the film being used opposite one or the other of the marks 53 and 54, or in between the two, will correct the exposure meter for the existing season of the year. It is apparent that because of the reduced diameter of the dial 44, shifting from "winter" to "summer" will displace the indicia 50 to a considerable extent.

The reference marks 53 and 54 are herein illustrated as marked for seasonal, or angle of sun, correction, but it is to be appreciated that the reference marks may likewise serve for correction of other variable factors such as filters of various degrees of opacity.

In order that the positioning of the indicators 20 and 21 may be reflected in the position of the light intensity dial 40, integrating mechanism is provided as follows. A graduated pivot 60 is fixed to a central portion of the frame portion 16. A sector gear 61 is pivotally mounted upon the first step of the pivot 60, the sector gear having teeth which mesh with the teeth of a pinion 62 fixed to the hub 43. A cam follower 64 is slidably mounted upon the lower surface of the sector gear, the cam follower in the present embodiment being T-shaped and having cam engaging portions 65 and 66 on its arms. The cam 31 has its highest point underlying the slowest shutter speed index 22, and the cam 36 has its highest point underlying the smallest stop index 23, the same being illustrated in Figs. 4 and 5. The lowest points of the cams similarly underlie the fastest shutter speed index and the largest stop index. Since each of the cams may be moved independently of the other, an infinitely variable number of positions may be assumed by the cam follower as the portions 65 and 66 are shifted about. In order to cause the shifting of the cam follower to rock the sector gear 61 about pivot 60, the cam follower is pivotally mounted upon the pivot 60 and is slidable longitudinally of the sector gear. This is preferably done by providing a slot 67 through which a reduced portion of the pivot 60 projects, and a spaced slot 68 through which passes the stem portion of a guide 69 fixed to the sector gear 61. The slots 67 and 68 are longitudinally aligned in the cam follower so that any pivotal movement of the cam follower causes pivotal movement of the sector gear 61. The cam follower is retained against the surface of the sector gear by the enlarged head of guide 69 and by a spring clip 70 retained in a groove in the end of the pivot 60. The cam follower is caused to bear against both cams by a pair of springs 71 tensioned between ears 72 on the arms of the cam follower and a spring anchoring bar 73 fixed by screws 74 to a portion of the frame. As illustrated in Figs. 4 and 5, the cam follower is at such a position that the central teeth of the sector gear mesh with the pinion. From this position a large number of other positions may be assumed, such as that illustrated in Fig. 13, whereby the pinion gear is rotated through arcs of movement reflecting the movements of the shutter speed and stop indicators. It is to be appreciated that the cam follower is herein illustrated as a T-shaped member, but that the shape thereof is unimportant; also, various other forms of sliding connections may be provided between the cam follower and the sector gear; and that in lieu of a sector gear and pinion drive other mechanical expedients may be utilized whereby rocking of a member such as sector gear 61 causes movement of a light intensity indicator.

When the exposure meter is utilized as a portion of a camera, the indicator 21 is connected to a diaphragm adjusting mechanism as set forth in Figs. 2 and 3 and, similarly, the shutter speed dial is connected to a shutter speed adjusting mechanism such as illustrated in my copending application, Serial No. 754,961, filed June 17, 1947, now Patent No. 2,553,015, wherein a cam is illustrated as connected to a speed indicator dial and mechanism is shown which is affected by the cam to regulate the speed of the shutter. Only so much of the mechanism as necessary for an understanding thereof is herein illustrated, and other forms of such mechanism may be substituted therefor.

In the illustrated form the cam 36 is fixed to a vertical shaft 80, the lower end of which is journaled in a fixed member 81 suitably mounted in the camera. A pinion 82 on shaft 80 meshes with the teeth of a rack 84, one end of which is provided with a slot 85 through which extends the stem of a vertical guide pin 86 and the other end of which is provided with a slot 87 through which extends the stem of a horizontal guide pin 88, the pins being mounted upon fixed supports 89 and 90 respectively, suitably mounted in the camera. As the shutter speed indicator dial is rotated, the rack 84 is shifted longitudinally. A vertically extending portion of the rack 84 is provided with a lug 91 which projects forwardly into a vertical slot 92 in an upwardly rising portion 94 of a diaphragm connecting member 96. The extremities of the member 96 are pivotally connected to arms 97 fixed to diaphragm adjusting rings 98 associated with the diaphragms (not shown) of the stereoscopic camera. As the rack 84 is moved longitudinally the connecting member 96 is also moved longitudinally and is permitted to move vertically by reason of the crosshead connection comprising the lug 91 and slot 92. It will be obvious from inspection of Fig. 2 that a single camera diaphragm adjusting ring could be operated by mechanism as illustrated and that any other suitable mechanism whereby rotation of shaft 80 is translated into rotation of a diaphragm adjusting ring 98 may be substituted therefor. In Fig. 2 it is also seen that the cam 31 is connected to a shaft 100 which, in turn, may be connected to any suitable shutter speed regulating mechanism such as illustrated in the aforesaid copending application.

It is preferred that the rotation of cams 31 and 36 and of the mechanism connected thereto be limited so as to protect the various associated mechanisms. In order to limit movement thereof, any suitable abutment means may be provided such as the pins 101 extending upwardly from the frame portion 16 into arcuate slots 102 in the lower surfaces of the indicator dials 20 and 21.

Figs. 13 and 14 illustrate a slight modification wherein the frame portion 16 and the connected rear wall 13 comprise a casing, the lower edge of which is slightly below the spring attaching bar 105 corresponding to the bar 73 in the first modification. A closure plate 106 bridges the lower edges of the vertical walls to protect the mechanism, the same being mounted on the frame as by means of screws 107. In this modification the lower ends of the shafts upon which the cams 31 and 36 are mounted are journaled in a pair of arms 108 formed integrally with the bar 105. Aside from the substitution of the modified form of spring attaching bar and the journaling of the cam shafts therein, the mechanism remains exactly the same and functions exactly the same as that previously illustrated.

*Operation*

In Figs. 1 and 2 the mechanism is illustrated at an intermediate position wherein the shutter speed has been set at 1/25 of a second, the diaphragm has been set at stop 6.3, and the light intensity dial has been adjusted with respect to the reference dial for proper selection of values when using a film of speed emulsion factor 20 in the summertime, or of factor 30 in the winter- time. In Figs. 4 and 5 the shutter speed has been slowed down to 1/10 of a second, the diaphragm has been closed to stop 16, and the light intensity dial has been shifted with respect to the reference dial to indicate that a film of emulsion speed factor 8 is being used in the summertime. The "bright sun" light index 50 being opposite the "light subject" index 51 indicates that at this stop and speed the only properly exposed picture which may be taken under the existing conditions is of a light subject under bright sun.

Figure 8:
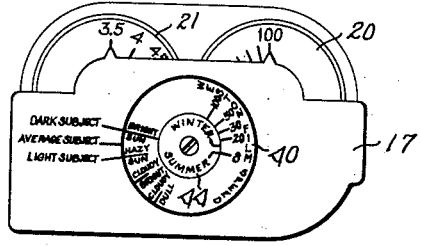
Figure 9:
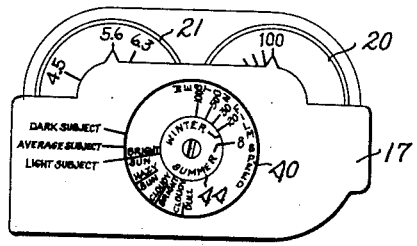
Figure 10:
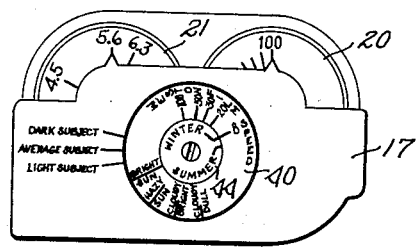
Figure 11:
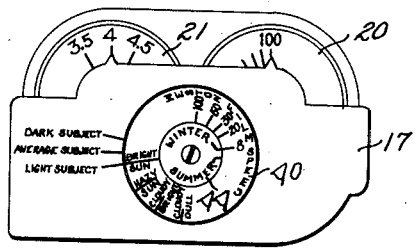
Figure 12:
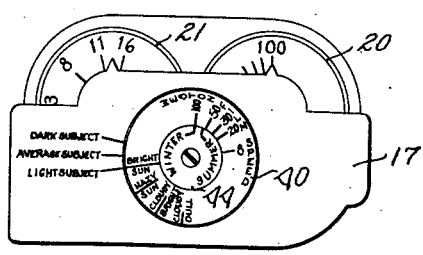

In Fig. 7 the diaphragm has been opened wide to stop 3.5, all other factors remaining the same as in Fig. 4, and the position of the light intensity dial indicates that at this slow speed and with a wide-open shutter only a dark subject may be properly photographed, and that only on a cloudy, dull day. In Fig. 8, with all other factors remaining the same, the shutter speed has been increased to 1/100 of a second and the position of the light intensity dial indicates that a light subject may be photographed only under a hazy sun or a dark subject under a bright sun. Therefore, if the speed of movement of the object or the desires of the photographer demand retention of the high shutter speed at 1/100 of a second, and the subject is light and the sun bright, the diaphragm aperture must be decreased to stop 5.6 as indicated in Fig. 9. In Fig. 10, under the same conditions as expressed with regard to Fig. 9, but with the picture being taken in the middle of the winter, the light intensity dial has been shifted with respect to the reference dial to place the film emulsion speed number 8 opposite the "winter" reference mark. The position of the light intensity dial now is such as to show that even the lightest subject under the brightest sun at this season of the year cannot be photographed properly. One of two things could be done: namely, to decrease the shutter speed until "bright sun" lines up with "light subject" or, as is indicated in Fig. 11, to open the shutter to stop 4 thus lining up the "bright sun" and "light subject" indices. In Fig. 12 an extremely fast film of speed value 100 is being used in the wintertime under the same conditions as previously expressed for a slow speed film in Fig. 11. Shifting the light intensity dial with respect to the reference dial, as illustrated in Fig. 12, so shifts the indicia 50 with respect to the indicia 51 as to indicate that one or the other of the cams must be adjusted. It will be apparent that under bright sun when photographing a light subject the only cam which can be adjusted to bring about proper alignment is the stop cam 36. Rotation of the indicator 21 until the "bright sun" and "light subject" indicia are aligned brings the indicator 21 to a position where the pointer 25 is midway between the stop values 11 and 16. An infinite number of correctly paired shutter speeds and stop values may be thus selected within the ranges permitted by the character of the subject and the intensity of the sun, each of which infinite number of values may be altered to compensate for other factors such as the film emulsion speed, the season of the year, the type of filter being used, and the like.

The operation of the integrating mechanism is illustrated in Figs. 5 and 13 wherein it is seen that as one or the other, or both, of cams 31 and 36 are shifted the cam follower is shifted either longitudinally with respect to the sector gear or pivotally about the pivot 69, or a combination of such movements, the net result being pivotal movement of the sector gear and pinion 62 whereby the light intensity dial is moved in accordance with the positioning of the two cams.

Having illustrated and described preferred embodiments of the invention, it will be apparent to those skilled in the art that the invention permits of modification in arrangement and detail. I claim as my invention all such modifications as come within the true spirit and scope of the appended claims.

I claim:

1. In an exposure meter including a stop indicator, a shutter speed indicator, and a light intensity indicator; means to variably position said light intensity indicator depending upon the positions of said stop and shutter speed indicators comprising a pinion connected to said light intensity indicator, a first cam connected to said stop indicator, a second cam connected to said shutter speed indicator, a pivot fixed with respect to said pinion, a sector gear pivotally mounted upon said pivot and meshing with said pinion, a guide pin projecting from said sector gear, and a cam follower including a first follower portion bearing against said first cam, a second follower portion bearing against said second cam, and guiding means engaged with said pivot and guide pin whereby said cam follower is slidably mounted upon said sector gear and swings said sector gear about said pivot as said cams are moved.

2. In an exposure meter including a rotatable stop indicator dial, a rotatable shutter speed dial, and a rotatable light intensity dial; means to variably position said light intensity dial depending upon the positions of said stop indicator dial and shutter speed dial comprising a pinion connected to said light intensity dial, a first cam connected to said stop indicator dial, a second cam connected to said shutter speed dial, a pivot fixed with respect to said pinion, a sector gear pivotally mounted upon said pivot and meshing with said pinion, a cam follower having a first follower portion bearing against said first cam and a second follower portion bearing against said second cam, said cam follower having guiding means formed thereon engaged with said pivot whereby said cam follower is slidably mounted upon said sector gear, and pin and slot means interconnecting said cam follower and sector gear whereby said cam follower swings said sector gear about said pivot as said cams are moved.

3. An exposure meter including a stop indicator, a shutter speed indicator, a light intensity indicator, and means to move said light intensity indicator to various positions depending upon the positions of said stop and shutter speed indicators comprising a pinion connected to said light intensity indicator, a first cam connected to said stop indicator, a second cam connected to said shutter speed indicator, a pivot fixed with respect to said pinion, a sector gear pivotally mounted upon said pivot and meshing with said pinion, a cam follower including a first follower portion bearing against said first cam and a second follower portion bearing against said second cam, and spring means urging said cam follower portions against said cams, said cam follower having a slot therein embracing said pivot whereby said cam follower is pivotally and slidably movable with respect to said sector gear as said cams are moved, and cooperating guide means connecting said sector gear and cam follower for sliding movement in the direction of said slot whereby said cam follower swings said sector gear about said pivot.

4. An exposure meter including a rotatable stop indicator dial, a rotatable shutter speed dial, a rotatable light intensity dial, and means to swing said light intensity dial to various positions depending upon the positions of said stop indicator dial and shutter speed dial comprising a pinion connected to said light intensity dial, a first cam connected to said stop indicator dial, a second cam connected to said shutter speed dial, a sector gear meshing with said pinion, a cam follower having a first follower portion bearing against said first cam and a second follower portion bearing against said second cam, means slidably interconnecting said cam follower and said sector gear whereby said cam follower swings said sector gear as said cams are moved, and spring means urging said cam follower portions against said cams.

5. In an exposure meter including a movable stop indicator, a movable shutter speed indicator and a movable light intensity indicator; means to move said light intensity indicator to various positions depending upon the positions of said stop and shutter speed indicators comprising a pinion connected to said light intensity indicator, a first cam connected to said stop indicator, a second cam connected to said shutter speed indicator, a pivot spaced from said pinion, a sector gear pivotally mounted upon said pivot and meshing with said pinion, and a cam follower having a first follower portion bearing against said first cam, a second follower portion bearing against said second cam and guide means thereon cooperating with said pivot and said sector gear whereby said cam follower swings said sector gear about said pivot as said cams are moved by manipulation of the indicators connected thereto.

6. In an exposure meter including a rotatable stop indicator dial, a rotatable shutter speed dial and a rotatable light intensity dial; means to move said light intensity dial to various positions depending upon the positions of said stop indicator dial and said shutter speed dial comprising a pinion connected to said light intensity dial, a first cam connected to said stop indicator dial, a second cam connected to said shutter speed dial, a pivot spaced from said pinion, a sector gear pivotally mounted upon said pivot and meshing with said pinion, a guide pin mounted upon said sector gear between said pivot and said pinion, and a T-shaped cam follower having a first follower portion on one arm bearing against said first cam, a second follower portion on the other arm bearing against said second cam and guide means on the leg thereof cooperating with said pivot and guide pin whereby said cam follower swings said sector gear about said pivot as said cams are rotated by manipulation of the dials connected thereto.

7. In an exposure meter including a rotatable stop indicator dial, a rotatable shutter speed dial and a rotatable light intensity dial; means to move said light intensity dial to various positions depending upon the positions of said stop indicator dial and said shutter speed dial comprising a pinion connected to said light intensity dial, a first cam connected to said stop indicator dial, a second cam connected to said shutter speed dial, a pivot spaced from said pinion, a sector gear pivotally mounted upon said pivot and meshing with said pinion, a guide pin mounted upon said sector gear, a cam follower having a first follower portion bearing against said first cam, a second follower portion bearing against said second cam and guide means thereon cooperating with said pivot and said guide pin whereby said cam follower swings said sector gear about said pivot as said cams are moved by manipulation of the dials connected thereto, and spring means urging said follower portions against said cams.

8. In an exposure meter including a manually rotatable stop indicator dial, a manually rotatable shutter speed dial and a rotatable light intensity dial; means to rotate said light intensity dial to various positions depending upon the positions of said stop indicator dial and said shutter speed dial comprising a shaft connected to said light intensity dial, a first cam connected to said stop indicator dial, a second cam connected to said shutter speed dial, a pivot fixedly supported between said cams, a member pivotally mounted on said pivot, a guide pin mounted upon said member, a cam follower having a first follower portion on one arm bearing against said first cam, a second follower portion on the other arm bearing against said second cam and slots therein embracing said pivot and guide pin whereby said cam follower is slidably mounted upon said member and swings said member about said pivot as said cams are rotated by manipulation of the dials connected thereto, spring means urging said follower portions against said cams, and means driven by said member to rotate said shaft.

9. In an exposure meter including a stop indicator, a shutter speed indicator and a light intensity indicator; means to move said light intensity indicator to various positions depending upon the positions of said stop and shutter speed indicators comprising a pinion connected to said light intensity indicator, a first cam connected to said stop indicator, a second cam connected to said shutter speed indicator, a pivot spaced from said pinion, a sector gear pivotally mounted upon said pivot and meshing with said pinion, a cam follower having spaced follower portions bearing against said cams whereby said cam follower is moved to various positions upon movement of one or the other or both of said cams, and cooperating means formed on said sector gear and said cam follower whereby said cam follower is slidably mounted upon said sector gear and rocks said sector gear about said pivot as said cams are shifted.

10. In an exposure meter including a manually movable stop indicator, a manually movable shutter speed indicator and a movable light intensity indicator; means to move said light intensity indicator to various positions depending upon the positions of said stop indicator and said shutter speed indicator comprising a shaft connected to said light intensity indicator, a first cam driven by said stop indicator, a second cam driven by said shutter speed indicator, a pivot fixedly supported between said cams, a member pivotally mounted on said pivot, a guide pin mounted upon said member, a cam follower having a first follower portion bearing against said first cam, a second follower portion bearing against said second cam and slots therein embracing said pivot and said guide pin whereby said cam follower is slidably mounted upon said member and swings said member about said pivot as said cams are moved upon manipulation of the dials connected thereto, and means driven by said member to rotate said shaft.

11. An exposure meter comprising a frame, a stop indicator movably mounted on said frame and having stop indicia thereon, a shutter speed indicator movably mounted on said frame adjacent said stop indicator and having shutter speed indicia thereon, a first cam driven by said stop indicator, a second cam driven by said shutter speed indicator, integrating mechanism including a sector gear pivotally mounted on said frame, means interconnecting said cams and said sector gear to rock said sector gear about its pivot to reflect selected stop and shutter speed settings as determined by the positions of said cams, a pinion rotatably mounted on said frame with its teeth meshed with the teeth of said sector gear, and a light intensity indicator driven by said pinion and having light intensity indicia thereon, said frame having a plurality of subject indicia thereon adjacent said light intensity indicator whereby the positioning of a properly selected light intensity index on said light intensity indicator opposite a properly selected subject index on said frame accomplished by manipulation of one or the other or both of said stop and shutter speed indicators will indicate a variable number of properly paired stop and shutter speed settings for correct exposures.

12. The structure set forth in claim 11 in which the position of said light intensity indicator may be adjusted in order to compensate for other factors in the determination of stop and shutter speed settings such as the emulsion speed of the film being used and the existing season of the year.

13. An exposure meter comprising a frame, a stop indicator movably mounted on said frame and having stop indicia thereon, a shutter speed indicator movably mounted on said frame adjacent said stop indicator and having shutter speed indicia thereon, a first cam fixed to said stop indicator, a second cam fixed to said shutter speed indicator, integrating mechanism including a member pivotally mounted on said frame and means interconnecting said cams and said member to rock said member about its pivot to reflect the selected stop and shutter speed settings as determined by the positions of said cams, a shaft driven by said member, a light intensity indicator frictionally connected to said shaft, and a reference member fixedly connected to said shaft, said reference member having a reference mark thereon and said light intensity indicator being provided with a plurality of film emulsion speed indicia which may be selectively positioned opposite said reference mark by slipping the frictional connection of said light intensity indicator to said shaft.

14. The combination set forth in claim 13 in which said reference member has a spaced pair of reference marks thereon, said spaced reference marks being so positioned that the placing of a selected film emulsion speed index on said light intensity indicator opposite one or the other reference mark or therebetween compensates for the angle of the sun at the existing season of the year.

GORDON N. SMITH.

REFERENCES CITED

The following references are of record in the file of this patent:

UNITED STATES PATENTS

| Number | Name | Date |
|---|---|---|
| 883,607 | Andrews | Mar. 31, 1908 |
| 1,543,208 | Fairchild | June 23, 1925 |
| 1,623,998 | Cooke | Apr. 12, 1927 |
| 1,864,180 | Bing | June 21, 1932 |
| 1,996,828 | Peabody | Apr. 9, 1935 |
| 2,421,504 | Hickok | June 3, 1947 |